Jan. 5, 1960 J. W. HALLEY 2,919,983
IRON ORE REDUCTION PROCESS
Filed May 22, 1958
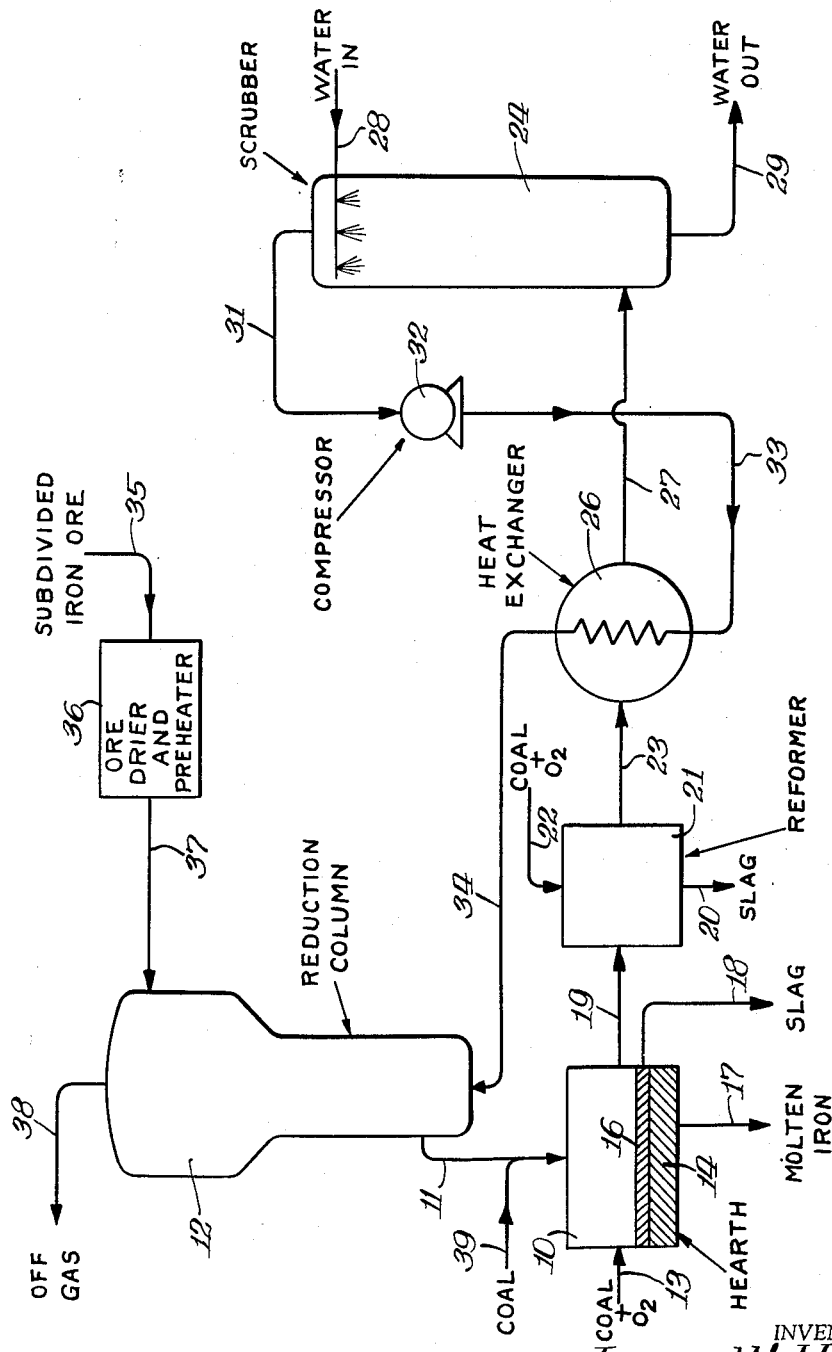
INVENTOR.
James W. Halley,
BY
Davis, Lindsey, Hibben & Noyes
Attys.

United States Patent Office 2,919,983
Patented Jan. 5, 1960

2,919,983

IRON ORE REDUCTION PROCESS

James W. Halley, Dune Acres, Ind., assignor to Inland Steel Company, Chicago, Ill., a corporation of Delaware Application May 22, 1958, Serial No. 737,015

14 Claims. (Cl. 75—38)

This application is a continuation-in-part of my copending application Serial No. 630,195 filed December 24, 1956, now abandoned.

This invention relates to the direct reduction of iron oxide, particularly iron oxide ores, by the use of a reducing gas comprising principally carbon monoxide and hydrogen.

Many different processes have been proposed for the production of metallic iron from iron ore. However, except for unusual raw material conditions, the use of the conventional blast furnace has been considered to be the most economical and commercially feasible technique for the production of pig iron. In spite of its widespread use, the blast furnace suffers from two serious handicaps associated with the raw materials which are charged to the blast furnace: (1) the iron ore used in the blast furnace must have a fairly large particle size so that it will not be blown out of the top of the furnace, and (2) the only really satisfactory fuel for use in the blast furnace is metallurgical coke which possesses sufficient strength to support a column of solids in the furnace.

Both of the aforementioned limitations on the blast furnace raw materials are becoming increasingly acute. For example, to mention only one aspect of the ore problem, various iron ore concentrating processes now in use produce a finely divided material which cannot be charged as such to the blast furnace but first must be pelletized or sintered. Obviously, this necessary step adds considerably to the cost of operating the blast furnace. With respect to coke, under present day conditions the supply of good coking coals is rapidly decreasing and the cost of coke plants is increasing. As a result, the cost of coke today represents the greatest single item in the conversion of iron ore to pig iron in the blast furnace. Furthermore, the rapid rise in capital costs for installation of new blast furnace capacity makes it imperative to find a simpler and less expensive substitute for the blast furnace.

It has long been known that subdivided or granular iron ore can be converted to a mixture of metallic iron and gangue by treating it at an elevated temperature with suitable reducing gases. In fact, the prior art is replete with disclosures and suggestions of various types of socalled direct reduction processes. However, for many different reasons, none of the suggested processes have been adopted on a commercial scale. Although direct reduction of iron ore for the production of so-called sponge iron or synthetic scrap has perhaps received the greatest attention, to my knowledge no one has heretofore proposed a technically feasible and economically attractive integrated smelting process involving direct reduction of iron ore by a reducing gas and melting of the reduced iron to produce hot metal suitable for use in a steelmaking process. The combined reduction and melting processes suggested in the prior art are characterized either by a serious heat deficiency or by an excessive fuel consumption with the result that such processes are either technically inadequate or highly impractical from an economic viewpoint. Moreover, in some instances at least, the processes proposed in the prior art are subject to serious operating difficulties.

The present invention is based on the discovery that by utilizing certain preferred process techniques in the various steps of the process and by adhering to a certain coordinated combination of critical operating conditions, it is possible to effect direct reduction of iron ore and melting of the reduced iron in a practical and economically feasible manner which has not previously been possible. As explained more fully below, the crux of the present invention is the concept of a "balanced" process wherein the gas produced by combustion of fuel in certain stages of the process is balanced against or closely coordinated with the gas requirements in the reduction step of the process thereby realizing a minimum fuel consumption while at the same time supplying all of the chemical and thermal requirements of the process. This concept of a "balanced" process is unique in the art and is responsible for the technical and economical feasibility of the present process as compared with previous unsuccessful and impractical proposals.

Accordingly, a primary object of the invention is to provide a novel and improved process for the direct reduction of iron ore and melting of the reduced iron.

A further object of the invention is to provide a novel process of the foregoing character which is economically attractive as compared to schemes heretofore proposed.

Another object of the invention is to provide a novel "balanced" process for reducing iron ore and melting the reduced iron wherein the thermal and chemical requirements of the process are satisfied with minimum fuel consumption.

An additional object of the invention is to provide a novel coordinated combination of a melting-gas generation step with a gas reforming step for use in a process of the foregoing type.

Other objects and advantages of the invention will become apparent from the subsequent detailed description taken in conjunction with the accompanying drawing which is in the nature of a diagrammatic flow sheet illustrating a preferred method of practicing the invention.

Broadly speaking, my invention involves three principal process stages: (1) a combined melting and gas generator zone, also referred to as a hearth zone, wherein a fuel is burned with oxygen in order to melt and separate the iron from the reduced ore and at the same time producing combustion gas, (2) an upgrading or reforming zone wherein the combustion gas from the first zone is treated with additional fuel and oxygen to increase its reducing capacity, and (3) a reduction zone wherein subdivided iron ore is contacted with the reformed gas from the second zone and from which the resultant reduced iron ore is passed to the first zone.

One prior art process of the aforementioned general character is exemplified by U.S. Patent No. 2,526,658 wherein an oxidizing environment is obtained in the hearth zone by combustion of fuel with air and subsequently the $CO_2$-rich products of combustion are said to be reformed by reaction with incandescent carbon. However, this type of prior art process is deficient in that it is impossible to accomplish the required extent of reforming with incandescent carbon and as a result there is an inadequate production of reducing gas in the reforming step to supply the chemical requirements in the reducing zone. As a result, it is necessary to add carbon to the ore charge so that part of the reduction is effected by reaction with the added carbon and part of the reduction is accomplished by the reducing gas from the reforming zone. Since the reduction of ore with carbon requires a relatively higher operating temperature, it also becomes necessary to supply additional heat by means of separate burners in the reducing zone. Even the substitution of oxygen for air in the combustion step at the hearth zone cannot overcome the inherent heat deficiency of the process because of the loss of the sensible heat of the nitrogen content of the air, and the only way in which the heat deficiency can be met is by the combustion of excessive quantities of fuel in both the hearth zone and the reduction zone.

Other processes heretofore suggested in the prior art have contemplated regulating the combustion of fuel in the hearth zone so that the flame and its products of combustion are reducing in character, i.e., the carbon in the fuel is burned principally to CO. For example, in U.S. Patent No. 2,750,277 it is contemplated that the products of combustion will have a $CO:CO_2$ ratio not less than 2 and a $H_2:H_2O$ ratio not less than 1. Presumably the theory of such prior art processes is that the CO-rich gas produced in the hearth zone can be used directly in the reduction of iron ore without the necessity for intermediate reforming or enrichment. However, I have found that in such a system it becomes necessary to consume excessive quantities of fuel and oxygen in the hearth zone in order to meet the thermal requirements for the melting operation and, furthermore, as a result of the large fuel consumption there is an enormous production of gas. The high fuel and oxygen cost and the increased equipment size for handling the large volume of gas in the system render the process economically unattractive and impractical.

Thus, the prior art processes which purport to provide an integrated direct reduction and melting operation for the production of molten iron from iron ore have been characterized either by a deficiency of heat and reducing capacity or by an excessive fuel consumption and an excessive gas production. I have discovered that by adhering to a certain critical combination of operating conditions and procedures it is possible to realize a balanced operation wherein all of the thermal and chemical requirements of the melting and reduction steps can be supplied with a minimum consumption of fuel and oxygen and without encountering either a deficiency or an excessive production of reducing gas. As will hereinafter appear, my process does not require the introduction of extraneous carbon or the burning of extra fuel in the reducing zone. On the contrary, the chemical and thermal requirements of the reducing zone are met entirely by the reducing capacity and the sensible heat of the reformed combustion gas from the hearth zone. Furthermore, my process provides adequate heat in the hearth without excessive consumption of fuel and oxygen. The critical combination of conditions required for realizing a balanced process of this character will now be described.

HEARTH ZONE

I have found that it is impossible to supply the thermal requirements of the melting operation on an economically practical basis unless the combustion of fuel is sufficiently complete to produce a substantial quantity of $CO_2$. If it is attempted to supply the heat required for melting by burning the fuel only to CO, then excessive amounts of fuel and oxygen are consumed and an excessive volume of gas must be handled. In the present invention I must first of all employ a carbonaceous or hydrocarbonaceous fuel having a H:C atomic ratio of less than 3. Although hydrocarbon gases and liquids meeting this requirement may be utilized, the preferred fuel is a solid carbonaceous fuel such as anthracite, bituminous or sub-bituminous coal, lignite, peat, or coke. In general, pulverized coal is the preferred fuel. The reason for the above-mentioned limitation on the H:C ratio of the fuel is to avoid undesirable reduction in luminosity of the flame and consequent reduction of heat transfer in the hearth. Furthermore, it is desirable to minimize the amount of $H_2O$ and $H_2$ in the reducing gas for reasons explained more fully below.

It is also necessary that the oxidizing gas for the fuel in the hearth zone contain at least 85% oxygen. Normally, it is preferred to employ a commercial grade of free oxygen which may be about 99% pure, but it is also within the scope of the invention to use oxygen enriched air or other inert gas mixed with oxygen as long as the total oxygen content is at least 85%. Coal in granular or pulverized form may be burned with the oxygen in the hearth zone by means of suitable burners of which many different designs are well known in the art.

To obtain the desired balanced operation, it is essential that the relative quantities of fuel and oxygen and the other combustion conditions in the hearth zone be so regulated that the combustion gas has a $CO_2:CO$ ratio of from about 0.7 to about 3 with the result that the gas is oxidizing to iron. Under these conditions a temperature of from about 2900° F. to about 3500° F. is obtained in the hearth zone and the heat of combustion is sufficient to insure melting of the iron in the reduced ore particles so as to separate the same from the gangue of the ore. Also, the existence of an oxidizng atmosphere in the hearth zone results in a substantially greater degree of silicon removal than is possible in the conventional blast furnace. If the $CO_2:CO$ ratio in the hearth zone is below the above described lower limit of about 0.7, a heat deficiency will exist in the hearth zone and the desired balanced operation is sacrificed. If the $CO_2:CO$ ratio is greater than the above disclosed upper limit of about 3, the resultant oxidizing conditions in the hearth are so severe that there is excessive reoxidation of molten iron and rapid deterioration of the refractory lining of the hearth may also be encountered. However, when the $CO_2:CO$ ratio is within the range of from about 0.7 to about 3, the thermal requirements of the melting step are satisfied and at the same time the fuel consumption and the gas production can be coordinated with the subsequent reforming step to achieve the desired overall balance.

Although the combustion atmosphere in the hearth zone is oxidizing to iron as discussed above, the molten iron is protected against excessive reoxidation by means of added carbon, either as extraneous carbon or as carbon fallout from the burners. It will be understood that the added carbon at the hearth zone will be incorporated in the slag which is formed in the hearth zone from the gangue in the reduced ore and also from the ash in the coal when coal is employed as the fuel. It is also contemplated that extraneous slag-forming materials, such as limestone or the like, may be added to the hearth zone to facilitate slag formation.

REFORMING ZONE

Since the combustion gas from the hearth zone contains a substantial amount of $CO_2$, as described above, it must be subjected to an upgrading or reforming treatment before it can be used for ore reduction purposes. Although theoretically the reforming of $CO_2$ can be accomplished by several different procedures, it is essential in order to achieve the balanced operation which is the objective of the present invention to carry out the reforming by introducing the hearth gas to a reforming zone wherein an excess of fuel is burned with oxygen in admixture with the hearth gas to effect endothermic reaction of the $CO_2$ and $H_2O$ in the hearth gas with carbon and hydrogen from the excess fuel. In other words, part of the fuel introduced to the reforming zone is burned with oxygen to provide heat for the endothermic reforming reactions and the carbon and hydrogen content of another portion of the fuel introduced to the reforming zone is reacted endothermically with $CO_2$ and $H_2O$ to obtain CO and $H_2$, respectively. At the same time, the temperature of the combustion gas from the hearth zone is lowered appreciably. For example, the temperature in the reforming zone and the temperature of the effluent reformed gas may be from about 1900° F. to about 2400°

F. As was the case in the hearth zone, the preferred fuel for the reforming operation is pulverized coal and the preferred oxygen-rich gas is commercial grade free oxygen.

In order to insure adequate reducing capacity without an excessive volume of gas, it is essential that the $CO_2$ content of the hearth gas be decreased in the reforming step to the extent that the reformed gas contains not more than about 10% $CO_2$ with a $CO:CO_2$ ratio of at least about 7, and preferably not more than about 5% $CO_2$ with a $CO:CO_2$ ratio of at least about 10. In addition, it is also important that the hydrogen content of the reformed gases be limited as far as possible. Dependent upon the nature of the fuel which is burned in the hearth zone and in the reforming zone, a certain amount of hydrogen will be present in the reformed gas. Also, any moisture present in the hearth gas may be reduced by reaction with carbon in the reforming zone, as heretofore explained, to form additional hydrogen. However, by exercising care in the selection and preparation of the fuel it is possible to avoid the presence of excessive amounts of hydrogen in the reformed gases. As an upper limit, the $H_2:CO$ ratio should in no case be greater than about 1, and it is preferred that this ratio be not greater than about 0.5. From stoichometric and thermodynamic considerations it is found that the optimum gas utilization, i.e. the percentage of reducing gas which is consumed by reaction with iron oxide, is realized at a lower reaction temperature for CO-rich mixtures and that the reaction temperature for optimum gas utilization increases with increasing hydrogen content in the reducing gas. In addition, the reaction of iron oxide with $H_2$ is endothermic while the reaction of iron oxide with CO is slightly exothermic so that an unnecessary heat burden is imposed on the reduction zone if the $H_2:CO$ ratio in the reducing gas is too high. Also, if the hydrogen content of the reducing gas is too high, the reaction of $CO_2$ with the $H_2$ produces large quantities of water which is either lost when the gas is cleaned or reacts to produce more $CO_2$ as the temperature is lowered during subsequent use of the gas in the reducing zone.

The coordinated operation of a hearth zone and a reforming zone in the manner described above is essential in order to obtain a balanced operation wherein both the thermal and chemical requirements of the process are satisfied without excessive fuel or oxygen consumption and with optimum gas production. I have found that the only way in which this balance can be achieved is by utilizing a reforming step of the type described wherein, in its preferred form, an excess of coal is burned with an oxygen-rich gas in admixture with the combustion gas from the hearth zone having a $CO_2:CO$ ratio of from about 0.7 to about 3. For example, if the hearth conditions are such that the combustion zone has a $CO_2:CO$ ratio near the lower limit of about 0.7, the amount of $CO_2$ to be reformed in the reforming zone is less and the consumption of coal and oxygen in the reforming zone is decreased but at the same time an increased consumption of coal and oxygen is necessary in the hearth zone in order to supply the thermal requirements of the hearth zone. On the other hand, if the hearth is operated so that the $CO_2:CO$ ratio of the combustion gas is near the upper limit of about 3, the fuel requirements of the hearth are considerably reduced but an increased amount of fuel must be burned in the reformer to effect reforming of the greater quantity of $CO_2$ in the hearth gas. However, throughout the 0.7 to 3 range for $CO_2:CO$ in the hearth zone, the combined fuel consumption and the combined oxygen consumption for the hearth and reformer together are substantially constant and likewise the combined gas production from the hearth and reformer is substantially constant. It is only by means of the reforming technique herein described that it is possible to operate the hearth zone so as to meet the thermal requirements of the hearth without encountering excessively oxidizing hearth conditions while at the same time providing an optimum amount of reformed hearth gas having adequate reducing capacity and sensible heat to carry out the subsequent reduction reactions in the reducing zone.

REDUCING ZONE

In the reducing step of the process subdivided or granular iron oxide ore is contacted with the reformed gas at a temperature of from about 900° F. to about 1800° F. and a pressure of atmospheric or slightly above. The ores which may be used in the process comprise any of the well known iron oxide ores including hematite, magnetite, and others, which may contain from about 5 wt. percent to about 45 wt. percent gangue materials, particularly silica and alumina. Other ores similar to iron ore, such as iron-manganese ores, may also be used. It is also within the scope of the invention to charge to the reducing zone other iron oxide materials such as mill scale, etc.

In the preferred manner of practicing the invention, the subdivided iron ore and the reducing gas are contacted in a countercurrent operation with the ore moving downwardly in a continuous manner and the reducing gas passing upwardly therethrough. Although the countercurrent contacting of the subdivided iron ore with reducing gas may be conducted under so-called fluidized conditions wherein the fluid velocity of the upwardly flowing gas is sufficient to impart a turbulent fluid-like condition to the bed of solid particles which resembles in many respects a boiling liquid, it is preferred to operate the reducing zone as a simple non-fluidized moving bed wherein the fluid velocity of the upwardly flowing reducing gas is maintained below the threshold velocity for fluidization, and preferably not in excess of about 80% of the required velocity for fluidization.

In the reducing zone the reduction of iron oxide is effected entirely by reaction with CO and $H_2$ in the reducing gas and the heat of reaction is supplied substantially entirely by the sensible heat contained in the reducing gas. Thus, the subdivided iron ore fed to the reducing zone may be substantially carbon-free and the addition of extraneous carbon to the ore charge, as required in certain prior art processes, is unnecessary. Moreover, the burning of fuel in the reducing zone to supply heat for the reduction reactions is also unnecessary. The effluent ore particles from the reducing zone, comprising reduced iron, gangue, and a certain amount of unreduced iron oxide, are passed from the reducing zone to the hearth zone. The effluent reducing gas of depleted CO and $H_2$ content is withdrawn from the reducing zone and may be used as fuel or for other purposes dependent upon the content of unconsumed CO and $H_2$. By regulation of operating conditions in the reducing zone, such as temperature and residence time, a very substantial utilization of the reducing capacity of the gas may be realized.

The extent or degree of reduction of iron oxide in the reducing zone is preferably restricted so that the total iron (i.e. reduced Fe+Fe content of unreduced iron oxide) in the solids which are fed from the reducing zone to the hearth zone comprises from about 5 wt. percent to about 35 wt. percent unreduced iron oxide or FeO. Preferably, the amount of unreduced iron oxide or FeO should be from about 10 wt. percent to about 25 wt. percent. In other words, the reducing zone should be operated so that from about 65 wt. percent to about 95 wt. percent, and preferably from about 75 wt. percent to about 90 wt. percent, of the total iron in the solids fed to the hearth zone is present as reduced iron. This feature is important in the realization of the desired balanced operation because it affects the amount of gas produced and the consumption of fuel and oxygen. For example, if it is attempted to carry out substantially complete reduction of iron oxide in the reducing zone, then the heat requirements of the hearth are diminished to the extent that burning of sufficient fuel to accomplish melting alone will not yield enough gas to carry out the desired extent of reduction in the reducing zone. Consequently, excess fuel would have to be burned in either the hearth zone or the reforming zone. On the other hand, if the extent of reduction in the reducing column is less than specified above, then the thermal requirements of the hearth for accomplishing both melting and further reduction are so great that the fuel burned produces a greater volume of gas than is necessary to meet the chemical requirements of the reducing zone.

As heretofore mentioned, carbon or carbonaceous material is introduced to the hearth zone for protecting the molten iron against reoxidation. This added carbon or carbonaceous material also effects further, and in most cases substantially complete, reduction of the unreduced iron oxide fed to the hearth zone. The added carbon may comprise any convenient form of solid carbonaceous material such as coke, coal or graphite but pulverized coal will usually be most convenient and economical. Introduction of the carbon is preferably accomplished by adding the same directly to the hearth zone, either alone or in admixture with the solids fed from the reducing zone. However, the introduction of carbon to the hearth zone can also be accomplished under certain conditions by control of the coal-oxygen burners in the hearth zone so as to obtain fall-out of excess unburned coal. In either case, the added carbon is rapidly assimilated in the liquid slag-metal system and under the high temperature conditions existing in the hearth zone the desired further reduction of iron oxide is readily effected and the desired protection of the molten iron against reoxidation is also realized. In addition, the carbon added at the hearth zone may also effect carburization of the molten iron to yield a product of desired carbon content. For example, by limiting the extent of carburization, a molten iron having a carbon content of 1 wt. percent or less may be obtained, or if larger amounts of carbon are introduced, a molten iron having from 2 to 4 wt. percent carbon may be obtained as the final product of the process.

DRAWINGS

Referring to the drawing, one specific arrangement of apparatus for carrying out the process will now be described. In the illustrated embodiment, the combined melting and gas generator zone comprises a refractory lined hearth 10 into which the reduced iron ore is fed through a discharge line 11 from a reduction column 12. In the hearth 10 coal is burned with oxygen introduced as a preformed mixture at 13. As heretofore described in detail, the combustion conditions are regulated to provide an oxidizing atmosphere wherein the combustion gas has a $CO_2:CO$ ratio of from about 0.7 to about 3 and the temperature in the hearth 10 may be from about 2900° to about 3500° F.

The molten iron in the hearth 10 is designated at 14 and the overlying slag blanket is designated at 16. Molten iron and slag may be withdrawn from the hearth 10 as desired through lines 17 and 18, respectively.

The combustion gas from the hearth 10 passes through a line 19 to a coal gasifier or reformer 21 to which oxygen and an excess of coal are supplied through a line 22. The carbon in part of the coal supplied at 22 reacts with the $CO_2$ in the combustion gas supplied at 19, and the endothermic heat requirements for the reduction reactions are furnished by the sensible heat in the combustion gas supplemented by additional heat evolved in the reformer 21 by combustion of another part of the coal supplied through the line 22. Since coal is burned in the reformer 21, residual ash is left, some of which may be removed through a line 20 as a liquid or semi-solid slag and the remainder of the ash is carried out by the exit reformed gas through a line 23. As heretofore described, the extent of reforming carried out in zone 21 must be sufficient so that the reformed gas removed through the line 23 contains not more than about 10% $CO_2$ with a $CO:CO_2$ ratio of at least about 7, and preferably not more than about 5% $CO_2$ with a $CO:CO_2$ ratio of at least about 10. Furthermore, as was also previously described, the $H_2:CO$ ratio in the gas removed at line 23 should not be greater than about 1 and preferably not greater than about 0.5.

Because of the endothermic reactions carried out in the reformer 21, the temperature of the reformed gas is substantially lower than the temperature of the hearth gas, e.g. the CO-rich gas discharged at 23 may be at a temperature of from about 1900° F. to about 2400° F. Before this gas can be employed in the reduction column 12 it must be cooled still further and must also be treated for the removal of entrained coal ash. Although a gas cleaner such as a cyclone separator or an electrostatic precipitator may be used to effect removal of ash, the drawing shows by way of illustration a water scrubber or washer 24 which effects quite complete removal of coal ash but requires preliminary cooling of the hot gas. Thus, the hot gas passes from the line 23 through a heat exchanger 26 where the gas is cooled to a temperature on the order of 500 to 600° F. and is thence introduced through a line 27 to the base of the scrubber 24. Water or other aqueous or liquid cleaning agent is introduced into the top of the scrubber through a line 28 for countercurrent contacting with the reducing gas. If desired, the scrubbing liquid introduced through the line 28 may also comprise a chemical reactant or solvent such as monoethanolamine for selectively removing further amounts of $CO_2$ from the gas. The effluent scrubbing liquid is removed from the scrubber 24 through a line 29 for discard, recirculation, or recovery treatment, as the case may be.

For the practical reasons of simplifying the hearth construction and facilitating access to the hearth, it is usually preferred that the hearth zone 10 be operated at substantially atmospheric pressure. Under such circumstances, it is necessary to provide a gas pump or compressor in the system for effecting passage of the gas through the various stages of the process and particularly through the reduction column 12. Thus, in the present instance, the effluent clean reducing gas from the scrubber 24 passes through a line 31 to a compressor 32 and thence through a line 33 to the heat exchanger 26 wherein the previously cooled and cleaned gas is reheated to a suitable reaction temperature of from about 900° F. to about 1800° F. The reheated reducing gas then passes through a line 34 to the bottom of the reduction column 12.

Before being introduced into the reduction column 12, the subdivided or granular iron oxide ore is passed through a line 35 to a drying and preheating zone, indicated schematically at 36, for removing free and combined water associated with the ore. Dependent upon the type of ore involved and its combined water content, the ore will be preheated to a temperature of from about 250° F. to 900° F. in the zone 36 and is then introduced through a line 37 to the top of the reduction column 12 wherein it passes downwardly in a continuous manner in countercurrent relation with respect to the upwardly moving reducing gas introduced at 34. In accordance with the balanced process concept of the present invention, the sensible heat in the reducing gas stream 34 is entirely adequate to supply the thermal requirements for the reduction reactions which take place in the reduction column 12 at a temperature of from about 900° F. to about 1800° F. The purpose of the preheating step in the zone 36 is merely to dry the ore and also to offset normal heat losses. The effluent reducing gas is removed from the top of the column 12 through a line 38 at a temperature of from about 400° F. to about 1000° F. and may be treated according to various techniques well known in the art for recovery of fines. Inasmuch as the off-gas removed through the line 38 will usually contain some unreacted CO and H₂, the gas may be used as a fuel or for other purposes. For example, this gas may be burned to supply heat for the ore drying and preheating step 36.

The reduced solids are removed from the bottom of the column 12 through the line 11 and fed to the hearth zone 10 as previously described. Coal is preferably added at this point through a line 39 to supply the carbon required in the hearth 10 for protecting the molten iron against reoxidation, for completing the reduction of unreduced iron oxide in the solids from the reduction column, and for carburizing the molten iron. Although in the illustrated schematic drawing the coal supply introduced through the line 39 is commingled with the reduced solids in the line 11 before the introduction into the hearth zone 10, it will be appreciated that the coal may also be introduced directly to the hearth 10 through a separate line. As heretofore explained in greater detail, the thermal requirements of the hearth 10 will be affected by the amount of unreduced iron oxide or FeO in the reduced solids fed through the line 11. Thus, if the amount of unreduced iron oxide fed to the hearth 10 is increased, the thermal requirements of the hearth are increased because of the greater extent of reduction by reaction with carbon which must be carried out in the hearth but at the same time the amount of CO required in the reduction column 12 is correspondingly reduced. On the other hand, if the amount of unreduced iron oxide fed to the hearth 10 through the line 11 is decreased, the thermal requirements at the hearth are likewise decreased but the quantity of CO required in the reduction column 12 increases. As previously pointed out, I have found that an optimum balance is achieved if the total iron in the solids withdrawn from the column 12 through the line 11 comprises from about 5 wt. percent to about 35 wt. percent unreduced iron oxide, and preferably from about 10 wt. percent to about 25 wt. percent.

Accordingly it will be seen that the invention provides an effective combination of features and balanced operating conditions which result in an overall process having a high degree of practicability and economic attractiveness. The following specific example of a complete operation in accordance with the foregoing principles will further illustrate and explain the invention.

*Example*

A combination apparatus embodying the system shown in the drawing was employed in the reduction of a high grade hematite ore of about 63% iron content and having a particle size of about −3 mesh. Over a number of experimental runs the calculated material balance based on the production of 1 ton of molten iron containing 2 wt. percent carbon was as follows:

In the hearth zone 558 lbs. of bituminous coal were added together with 10,540 s.c.f. (standard cubic feet) of 99% pure oxygen through coal-oxygen burners while feeding from the reduction column a total of 2420 lbs. of reduced iron ore solids, the total iron content of which comprises approximately 85 wt. percent reduced iron and 15 wt. percent unreduced FeO. In addition to the 2,000 lbs. of molten iron withdrawn from the hearth zone, 375 lbs. of slag were also tapped.

The combustion gas from the hearth zone had an average composition of 35.7% CO, 35.6% CO₂, 24.2% H₂O, and 4.5% H₂. A total of 17,060 s.c.f. of this combustion gas at a temperature of 3500° F. were introduced to the reformer wherein an additional 1212 lbs. of bituminous coal were burned with 8560 s.c.f. of 99% oxygen. A total of 54,200 s.c.f. of upgraded reducing gas was removed from the reformer at a temperature of 2200° F. with a gas composition as follows: 66.3% CO, 5.0% CO₂, 24.0% H₂ and 4.7% H₂O.

The CO-rich reducing gas at 2200° F. was passed from the reformer through the heat exchanger and therein cooled to 600° F. The cooled gas was scrubbed with water and a total of 55,000 s.c.f. of ash-free water-scrubbed gas at 100° F. was introduced into the suction side of the compressor. At this point the gas composition was as follows: 65.5% CO, 4.8% CO₂, 23.2% H₂, and 6.5% H₂O.

The discharge gas from the compressor at a pressure of 15 lbs./sq. in. gage and a temperature of 150° F. was passed through the heat exchanger wherein the gas was reheated to 1500° F. and thence passed to the reduction column in countercurrent non-fluidized relation with a downwardly moving bed of the subdivided iron ore. The ore was preheated to 400° F. before being introduced into the reduction column and contacted with the reducing gases at 1500° F. A total of 3150 lbs. of preheated ore was passed through the reduction column and the composition of the reduced iron ore as charged to the hearth zone from the reduction column was approximately as follows (wt. percent basis): metallic Fe 67.9%, FeO 17.7%, SiO₂ 11.1%, and Al₂O₃ 3.3%. The effluent "spent" reducing gases discharged from the reduction column at a temperature of 600° F. had the following composition: 34.8% CO₂, 31.2% CO, 23.4% H₂ and 10.6% H₂O.

Although the invention has been described with reference to certain specific embodiments by way of illustration, it will be understood that various modifications and equivalents may be resorted to without departing from the scope of the invention as defined in the appended claims.

I claim:

1. A balanced process for reducing iron oxide ore with a reducing gas and melting the reduced iron wherein the chemical and thermal requirements of the process are supplied with low fuel and oxygen consumption, said process comprising the steps of burning a fuel in a hearth zone with an oxygen-rich gas containing at least about 85% oxygen and controlling the combustion so that the CO₂:CO ratio in the combustion gas is from about 0.7 to about 3, passing the combustion gas from said hearth zone to a reforming zone and introducing thereto a fuel and an oxygen-rich gas containing at least about 85% oxygen, burning in the reforming zone a portion of the fuel introduced thereto with the oxygen-rich gas introduced thereto and thereby effecting endothermic reaction of another portion of the fuel with the CO₂ and H₂O content of said combustion gas to produce a reformed gas containing not more than about 10% CO₂ with a CO:CO₂ ratio of at least about 7 and a H₂:CO ratio not greater than about 1, contacting subdivided iron oxide ore in a reducing zone with said reformed gas at a temperature of from about 900° F. to about 1800° F. and thereby effecting reduction of a major portion of the iron oxide in the ore to iron but leaving a minor portion of unreduced iron oxide, the iron content of said minor portion of unreduced iron oxide comprising from about 5 wt. percent to about 35 wt. percent of the total iron content of the effluent solids from the reducing zone, discharging the mixture of reduced and incompletely reduced iron ore to said hearth zone and therein melting the reduced iron by the heat of combustion, and introducing carbonaceous material to the hearth zone for effecting further reduction of said unreduced iron oxide by reaction with carbon in the hearth zone and also for retarding oxidation of the molten iron in the hearth zone, the heat of combustion in said hearth zone being sufficient for melting the iron and effecting said further reduction of iron oxide therein, and the exit gas from said reforming zone having sufficient reducing capacity and sensible heat for effecting said reduction in the reducing zone.

2. The process of claim 1 further characterized in that said oxygen-rich gas consists essentially of free oxygen.

3. The process of claim 1 further characterized in that said iron oxide ore is contacted with said reformed gas in said reducing zone in a countercurrent non-fluidized moving bed operation.

4. The process of claim 1 further characterized in that said reforming zone comprises a coal gasifier wherein coal and oxygen are introduced along with said combustion gas, the carbon in a portion of the coal being reacted with $CO_2$ and $H_2O$ in the combustion gas and another portion of the coal being burned with the oxygen for supplying at least in part the endothermic heat requirements of the aforesaid reactions.

5. The process of claim 1 further characterized in that said iron oxide ore in the reducing zone is substantially carbon-free.

6. A balanced process for reducing iron oxide ore with a reducing gas and melting the reduced iron wherein the chemical and thermal requirements of the process are supplied with low fuel and oxygen consumption, said process comprising the steps of burning coal in a hearth zone with an oxygen-rich gas containing at least about 85% oxygen and controlling the combustion so that the $CO_2:CO$ ratio in the combustion gas is from about 0.7 to about 3 whereby to obtain a temperature of from about 2900° F. to about 3500° F. for melting iron, passing the combustion gas from said hearth zone to a reforming zone and introducing thereto coal and an oxygen-rich gas containing at least about 85% oxygen, burning in the reforming zone a portion of the coal introduced thereto with the oxygen-rich gas introduced thereto and thereby effecting endothermic reaction of carbon in another portion of the coal with the $CO_2$ and $H_2O$ content of said combustion gas to produce a reformed gas containing not more than about 10% $CO_2$ with a $CO:CO_2$ ratio of at least about 7 and a $H_2:CO$ ratio not greater than about 1, contacting subdivided iron oxide ore in a reducing zone with said reformed gas at a temperature of from about 900° F. to about 1800° F. and thereby effecting reduction of a major portion of the iron oxide in the ore to iron but leaving a minor portion of unreduced iron oxide, the iron content of said minor portion of unreduced iron oxide comprising from about 5 wt. percent to about 35 wt. percent of the total iron content of the effluent solids from the reducing zone, discharging the mixture of reduced and incompletely reduced iron ore to said hearth zone and therein melting the reduced iron by the heat of combustion, and introducing carbonaceous material to the hearth zone for effecting further reduction of said unreduced iron oxide by reaction with carbon in the hearth zone and also for retarding oxidation of the molten iron in the hearth zone, the heat of combustion in said hearth zone being sufficient for melting the iron and effecting said further reduction of iron oxide therein, and the exit gas from said reforming zone having sufficient reducing capacity and sensible heat for effecting said reduction in the reducing zone.

7. The process of claim 6 further characterized in that said oxygen-rich gas consists essentially of free oxygen.

8. The process of claim 6 further characterized in that said iron oxide ore in the reducing zone is substantially carbon-free.

9. A balanced process for reducing iron oxide ore with a reducing gas and melting the reduced iron wherein the chemical and thermal requirements of the process are supplied with low fuel and oxygen consumption, said process comprising the steps of burning coal in a hearth zone with an oxygen-rich gas containing at least about 85% oxygen and controlling the combustion so that the $CO_2:CO$ ratio in the combustion gas is from about 0.7 to about 3 whereby to obtain a temperature of from about 2900° F. to about 3500° F. for melting iron, passing the combustion gas from said hearth zone to a reforming zone and introducing thereto coal and an oxygen-rich gas containing at least about 85% oxygen, burning in the reforming zone a portion of the coal introduced thereto with the oxygen-rich gas introduced thereto and thereby effecting endothermic reaction of carbon in another portion of the coal with the $CO_2$ and $H_2O$ content of said combustion gas to produce a reformed gas containing not more than about 5% $CO_2$ with a $CO:CO_2$ ratio of at least about 10 and a $H_2:CO$ ratio not greater than about 0.5, contacting subdivided iron oxide ore in a reducing zone with said reformed gas at a temperature of from about 900° F. to about 1800° F. and thereby effecting reduction of a major portion of the iron oxide in the ore to iron but leaving a minor portion of unreduced iron oxide, the iron content of said minor portion of unreduced iron oxide comprising from about 10 wt. % to about 25 wt. % of the total iron content of the effluent solids from the reducing zone, discharging the mixture of reduced and incompletely reduced iron ore to said hearth zone and therein melting the reduced iron by the heat of combustion, and introducing carbonaceous material to the hearth zone for effecting further reduction of said unreduced iron oxide by reaction with carbon in the hearth zone and also for retarding oxidation of the molten iron in the hearth zone, the heat of combustion in said hearth zone being sufficient for melting the iron and effecting said further reduction of iron oxide therein, and the exit gas from said reforming zone having sufficient reducing capacity and sensible heat for effecting said reduction in the reducing zone.

10. The process of claim 9 further characterized in that said oxygen-rich gas consists essentially of free oxygen.

11. The process of claim 9 further characterized in that said iron oxide ore in the reducing zone is substantially carbon-free.

12. In an integrated process for reducing iron oxide ore with a reducing gas and melting the reduced iron by combustion of fuel, the improvement comprising the steps of burning fuel in a hearth zone with an oxygen-rich gas containing at least about 85% oxygen and controlling the combustion so that the $CO_2:CO$ ratio in the combustion gas is from about 0.7 to about 3 whereby to obtain a temperature of from about 2900° F. to about 3500° F. for melting iron, and reforming the resultant combustion gas in a reforming zone at a temperature of from about 1900° F. to about 2400° F. by introducing to the reforming zone said combustion gas, additional fuel, and an oxygen-rich gas containing at least about 85% oxygen, and burning in the reforming zone a portion of said additional fuel introduced thereto with the oxygen-rich gas introduced thereto and thereby effecting endothermic reaction of another portion of said additional fuel with the $CO_2$ and $H_2O$ content of said combustion gas to produce a reformed gas suitable for use in reducing iron oxide ore and containing not more than about 10% $CO_2$ with a $CO:CO_2$ ratio of at least about 7 and a $H_2:CO$ ratio not greater than about 1.

13. In an integrated process for reducing iron oxide ore with a reducing gas and melting the reduced iron by combustion of fuel, the improvement comprising the steps of burning coal in a hearth zone with an oxygen-rich gas containing at least about 85% oxygen and controlling the combustion so that the $CO_2:CO$ ratio in the combustion gas is from about 0.7 to about 3 whereby to obtain a temperature of from about 2900° F. to about 3500° F. for melting iron, and reforming the resultant combustion gas in a reforming zone at a temperature of from about 1900 F. to about 2400° F. by introducing to the reforming zone said combustion gas, additional coal, and an oxygen-rich gas containing at least about 85% oxygen, and burning in the reforming zone a portion of said additional coal introduced thereto with the oxygen-rich gas introduced thereto and thereby effecting endothermic reaction of another portion of said additional coal with the $CO_2$ and $H_2O$ content of said combustion gas to produce a reformed gas suitable for use in reducing iron oxide ore and containing not more than about 10% $CO_2$ with a $CO:CO_2$ ratio of at least about 7 and a $H_2:CO$ not greater than about 1.

14. In an integrated process for reducing iron oxide ore with a reducing gas and melting the reduced iron by combustion of fuel, the improvement comprising the steps of burning coal in a hearth zone with an oxygen-rich gas containing at least about 85% oxygen and controlling the combustion so that the $CO_2:CO$ ratio in the combustion gas is from about 0.7 to about 3 whereby to obtain a temperature of from about 2900° F. to about 3500° F. for melting iron, and reforming the resultant combustion gas in a reforming zone at a temperature of from about 1900° F. to about 2400° F. by introducing to the reforming zone said combustion gas, additional coal, and an oxygen-rich gas containing at least about 85% oxygen, and burning in the reforming zone a portion of said additional coal introduced thereto with the oxygen-rich gas introduced thereto and thereby effecting endothermic reaction of another portion of said additional coal with the $CO_2$ and $H_2O$ content of said combustion gas to produce a reformed gas suitable for use in reducing iron oxide ore and containing not more than about 5% $CO_2$ with a $CO:CO_2$ ratio of at least about 10 and a $H_2:CO$ ratio not greater than about 0.5.

References Cited in the file of this patent

UNITED STATES PATENTS

| | | |
|---|---|---|
| 2,526,658 | Harman et al. | Oct. 24, 1950 |
| 2,750,277 | Marshall | June 12, 1956 |